(12) United States Patent
LaToza et al.

(10) Patent No.: US 7,933,871 B2
(45) Date of Patent: Apr. 26, 2011

(54) DISCOVERING AND UPDATING TEMPLATES

(75) Inventors: Kenneth Charles LaToza, Redmond, WA (US); Kirill Novichikhin, Bellevue, WA (US); John Lincoln DeMaris, Bellevue, WA (US); Anthony Lawrence Jackson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 336 days.

(21) Appl. No.: 11/966,426

(22) Filed: Dec. 28, 2007

(65) Prior Publication Data

US 2009/0172005 A1 Jul. 2, 2009

(51) Int. Cl.
*G06F 17/00* (2006.01)

(52) U.S. Cl. ........ 707/640; 707/641; 707/644; 707/650; 707/654

(58) Field of Classification Search .................. 707/640, 707/641, 644, 650, 654
See application file for complete search history.

(56) References Cited

U.S. PATENT DOCUMENTS

| | | | |
|---|---|---|---|
| 6,157,931 A | 12/2000 | Cane et al. | 707/204 |
| 6,308,179 B1 | 10/2001 | Petersen et al. | 707/101 |
| 6,915,299 B1 | 7/2005 | Arcuri et al. | 707/200 |
| 6,938,037 B2 | 8/2005 | Severino et al. | 707/4 |
| 2002/0143816 A1 | 10/2002 | Geiger et al. | 707/513 |
| 2003/0196167 A1 | 10/2003 | Dewar | 705/8 |
| 2005/0010548 A1 | 1/2005 | Kobayashi | 715/531 |
| 2005/0097454 A1 | 5/2005 | Kinno et al. | 715/523 |
| 2006/0101321 A1 | 5/2006 | Friedrichowitz et al. | 715/530 |
| 2007/0130176 A1 | 6/2007 | Kawabe et al. | 707/101 |
| 2008/0065634 A1* | 3/2008 | Krinsky | 707/6 |
| 2009/0132902 A1* | 5/2009 | Dutta et al. | 715/207 |

OTHER PUBLICATIONS

"How to Create a SharePoint 2007 Workflow using Visual Studio 2008 Beta", Zlatan's Blog, Date: Sep. 15, 2007, http://dotnet.org.za/zlatan/, pp. 23.

* cited by examiner

*Primary Examiner* — Sana Al-Hashemi
(74) *Attorney, Agent, or Firm* — Merchant & Gould (57) ABSTRACT

Embodiments are provided to maintain templates associated with a client. New and updated templates can be provided to the client and accessed by a user. In an embodiment, a system can be configured to automatically update locally stored templates with updated templates associated with a library. The updated templates can replace or be used to update the locally stored templates and be used by an application user. In one embodiment, a client can be configured to automatically initiate an update process to retrieve and/or receive new and updated templates from an associated document library. The update process can also be used to provide additional information associated with a template, such as metadata describing aspects of an associated template.

19 Claims, 3 Drawing Sheets

DISCOVERING AND UPDATING TEMPLATES

BACKGROUND

Collaboration systems can be used by groups of users when working on collaborative projects. A collaboration system can include document libraries which can be used as repositories for maintaining documents and document templates. A document library can be included on a dedicated server and document templates can be accessed by users having appropriate access credentials. A document template can be used as a starting point for users to develop their own work product. Correspondingly, a user may save many hours when using a document template as a building block to create a personalized document. Moreover, document templates can be used to maintain a consistent document appearance and behavior for collaborating teams.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided to maintain templates and other information associated with a client. New and updated templates can be provided and used by a user. In an embodiment, a system can be configured to automatically update locally stored templates with updated templates associated with a library. The updated templates can replace or be used to update the locally stored templates and then be used by an application user. In one embodiment, a client can be configured to automatically initiate an update process to retrieve and/or receive new and updated templates from an associated document library. The update process can also be used to provide additional information associated with a template, such as metadata describing aspects of an associated template.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Embodiments are provided to automatically provide templates to users. In an embodiment, a system can be configured to automatically locate and provide templates associated with a document library to application users. The templates can be stored locally and used by an application user when creating documents, projects, spreadsheets, presentations, emails, drawings, etc. In one embodiment, a system can automatically provide new and updated templates as part of an update process. The system includes a client which can be configured to initiate the update process with a server to update templates stored locally with the client. Updated templates can replace or be used to update the locally stored templates and be used by an application user. For example, template parameters of a local template can be compared to template parameters of an updated template to determine what parts of the locally stored template should be updated as compared with the updated template. The update process can also be used to provide additional information associated with a template, such as extensible markup language (XML) data and metadata describing aspects of a template and an associated document library.

In another embodiment, a processor-based system can automatically provide document templates based in part on user links as part of a web service call. The user links point to targets, such as sites, libraries, templates, etc. that are available for the associated user. In one embodiment, the system includes a client that can be configured to periodically make a web service call to obtain a list of links on a server, wherein the links are targeted to an associated user. The links point to document libraries which include document templates that can be propagated to the client from associated websites or other locations. For example, templates associated with a user's "my links" can be automatically provided to a client and stored locally for use by an application user. Thereafter, the templates are available to an offline or online user for use in generating a work product, such as a tailored document based on an updated document template for a collaboration project.

Figure 1:
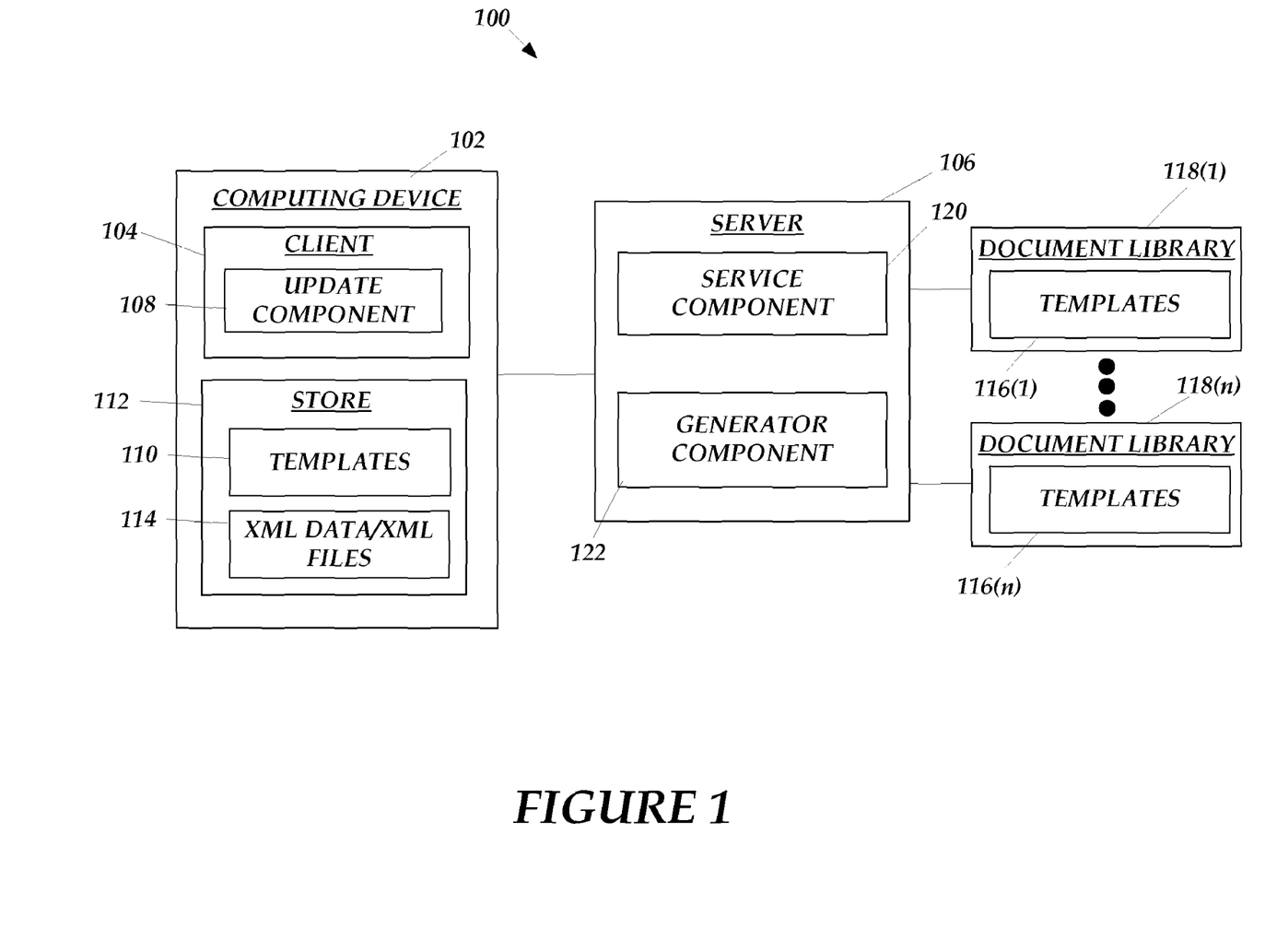
FIG. 1 is a block diagram of an example system that can be configured to maintain a number of templates.

FIG. 1 is a block diagram of a system 100 that can be configured to provide a collaborative operational environment, in accordance with an embodiment. The collaborative operational environment can be configured to provide a collection of information sites that are organized to provide centralized, unified, and coordinated access to information associated with the sites. In one embodiment, components of the system 100 can be configured using Microsoft® Windows® SharePoint® services technology. The Windows® SharePoint® Services technology enables users to create, maintain, and present a collaborative environment to share information. A user, such as an information worker or administrator for example, can use a web browser or other interactive user interface (UI) to interact with the collaborative environment. For example, a web browser can be configured to interpret web page description files, display web pages, display templates, etc.

As described below, components of the system 100 can be configured to provide templates to one or more clients associated with the system 100. For example, an administrator can upload new and/or updated document templates to a shared site and associated users can use the uploaded document templates to create collaborative documents for a workgroup. New and/or updated templates can be provided to a client so that an associated user has the most up-to-date templates for use in creating documents. In an embodiment, components of the system 100 can be configured to automatically provide document templates associated with one or more document libraries to associated users as part of a client initiated update process. Correspondingly, once the updated document templates are in place, users can generate work product, such as tailored documents from the associated document templates.

The system 100 includes networking, security, and/or other communication functionality to provide a collaborative interactive environment for associated users. Accordingly, the system 100 and its components include functionality to communicate with other computing devices, communication devices, and/or other systems and the system 100 is not intended to be limited to the embodiments and examples described herein. The system 100 and its components can be configured to communicate via a wired, wireless, and/or combination of various communication networks.

For example, WAN, LAN, distributed, cellular, pager, and other network communication services can be used as a communication means for components of the system 100. In one embodiment, the system 100 can be configured as a networked software-based system as part of a distributed computing environment, such as a .NET framework for example. Additionally, while a certain number and configuration of components are shown in FIG. 1, the system 100 can include other numbers of components and various configurations. For example, the system 100 can include a plurality of computing devices, clients, servers, libraries, and other components.

With continuing reference to FIG. 1, the system 100 includes a computing device 102 including a client 104, and a serving computing device 106 (hereinafter referred to as server 106), but the system 100 is not so limited. For example, the computing device 102 can be configured as a desktop, laptop, handheld, tablet, or other computing device. While the system 100 is shown to include a client 104, the system 100 can include multiple clients, wherein each client can include various functionality and other components. The client 104 includes an update component 108 that can be configured to initiate an update or synchronization process with the server 106 in order to update templates 10 stored locally in store 112. As described below, as part of the update process, the update component 108 can also store XML data and/or XML files 114 associated with templates, template locations, user group (s), and other information.

As shown in FIG. 1, the system 100 also includes a number of document libraries 118(1)-118(n), where n is an integer. The document libraries 118(1)-118(n) include an associated number of templates 116(1)-116(n). For example, a template can consist of an XML based representation which can include a set of XML files representing an application definition and a set of manifest XML files representing an associated application structure. Templates can be configured to include a predefined structure that addresses a particular user need or implementation, such as word processing templates, site templates, presentation templates, etc.

As an example, templates can be used as a starting point to: create a site where users can create, organize, and share information; create a site having a blank home page for customization; create a site for document collaboration; create a site where users can quickly and easily add, edit, and link web pages; create a site where users can post information and allow others to provide comments; create a site to plan, organize, and track meetings; create a blank meeting workspace site for user customization; create a site for reviewing documents and recording decisions made at an associated meeting; create a site to assist in planning and coordinating social occasions; create a site with tools to plan, organize, and track meetings with multiple pages; etc.

According to an embodiment, the document libraries can use SharePoint® collaboration service functionality to provide a collaboration and storage site for templates and other information. According to one embodiment, structured query language (SQL) functionality can be used to store and maintain content associated with the document libraries. Document libraries can be described as information repositories including information collections and other data. For example, certain document libraries can include content associated with designated applications, users, etc. To simplify the discussion, document library 118(1) and the associated templates 116(1) will be used in the following description.

The document library 118(1) includes a number of templates 116(1) that can be shared by designated users, such as users associated with user groups or having certain access rights. The document library 118(1) can also include metadata, XML data, and other data that can be used in describing aspects of the templates, including template name, location, modification date, administrator(s), user group(s), size, uniform resource locator (URL) of the path to the template(s), etc. As described below, the client 104 can use the update component 108 to automatically maintain and update the templates 10 stored locally in store 112.

In an embodiment, the update component 108 can be configured to compare one or more parameters of stored templates 110 with one or more parameters of associated templates 116(1) located in a document library 118(1) as part of an update process to update local templates stored in the store 112. As part of the update process, the update component 108 can be used to retrieve and/or receive new and/or updated templates from the server 106. In one embodiment, the update component 108 can be configured to examine one or more template attribute values when determining whether to update a locally stored template.

For example, the update component 108 can compare template modification data and/or file name data to ascertain whether a locally stored template should be replaced with an updated template maintained in the document library 118(1). Accordingly, the update component 108 can be used to maintain templates stored locally and can also be used to receive new templates. In an alternative embodiment, components of the server 106 can be configured to determine whether a new template should replace a template stored locally on the computing device 102, and can operate to communicate a new template or updated template to the client 104 for local storage to the store 112.

With continuing reference to FIG. 1, the server 106 can be configured to provide web hosting functionality, document storage functionality, navigation functionality, search functionality, application integration functionality, interactive functionality, personalization functionality, and other collaborative functionality. Additionally, the server 106 can include various functionality and other components, such as a front-end functionality, web servicing functionality, metadata managing functionality, markup language functionality, etc. In one embodiment, the server 106 can be configured as a web server, and information associated with the document libraries 118(1)-118(n) can be provided by and accessed through a web service infrastructure.

As shown in FIG. 1, the server 106 can be configured to include a service component 120 and a generator component 122, but the server 106 is not so limited. The service component 120 can be used to update information associated with the document libraries 118(1)-118(n). For example, a user, such as an administrator, can use a web browser or other interactive interface and use the service component 120 to interact with the document library 118(1) when updating or adding associated content. A user, such as an administrator, can use the service component 120 to add new templates, update templates, define user groups, define access rights, update/add content, and/or perform other operations associated with the document library 118(1).

The service component 120 can also be used to set one or more indicators to identify particular document libraries having templates to refer to during an update process when updating templates associated with a client, such as client 104. Each indicator can be included as part of an associated user link (e.g., "my links") data structure which can be retrieved using a web service call. In one embodiment, the service component 120 can be used to set a template synchronization flag to identify a document library to use when updating one or more templates as part of an update process. For example, the service component 120 can be used to set a flag identifying each document library and the associated templates for use in updating one or more of the templates 110 stored locally in store 112, wherein the flag can be included in the data structure of an associated URL.

The service component 120 can be used to control user access to certain document libraries. In one embodiment, the service component 120 can be used to define a set of document libraries that can be used to acquire templates. For example, an administrator can use the service component 120 to associate a first group of users with a first set of document libraries, while associating a second group of users with a second set of document libraries. Correspondingly, the first group of users can use templates associated with the first set of document libraries, and the second group of users can use templates associated with the second set of document libraries. Moreover, the first group of users can receive or retrieve template updates from the first set of document libraries, while the second group of users can receive or retrieve template updates from the second set of document libraries.

As described briefly above, the server 106 also includes a generator component 122. The generator component 122 can be used by the server 106 to generate information associated with an update process for an associated client, such as client 104, but the generator component 122 is not so limited. In an embodiment, the generator component 122 can be configured to generate XML data associated with a document library and associated templates as part of the update process. As described below, the generated XML data can be used to update templates and other information associated with the client 104.

In one embodiment, the generator component 122 can generate XML data to include an enumeration of templates associated with a document library, including descriptive data for each template contained in the document library. The generator component 122 can also be configured to generate an XML file describing templates for an associated document library, wherein the XML file can include a URL of a save path to the document library. The URL can be used when determining a default save location of any of the templates described in the XML file. The XML files and/or XML data can be communicated to the client 104 as part of an update process and stored to store 112.

As described above, as part of an update or synchronization process, the client 104 can use the update component 108 to receive or retrieve updated templates associated with one or more document libraries. As part of the update process, the update component 108 can use a number of template parameters associated with locally stored templates to determine whether to update one or more locally stored templates. In one embodiment, the update component 108 can compare cached XML data associated with the local template parameters to XML data associated with updated template parameters generated by the generator component 122 to determine whether to update one or more locally stored templates. For example, the update component 108 can compare template modification data (e.g., filenames, modification dates, etc.) to determine whether a locally stored template should be replaced with an associated template of a document library. The server 106 can use the template parameters to package new and updated templates which can be communicated to the client.

In another embodiment, the server 106 can be configured to compare template modification data, such as a modification date or modified file name for example, to determine if an updated template should be communicated to the client 104. If an associated template has been updated and the indicator indicates using a particular document library for updates, the server 106 can generate XML data and/or XML files so that the proper templates can be delivered to or retrieved from the appropriate document library by an associated client 104. Correspondingly, the system TOO can automatically provide the templates for access and use by designated users. For example, a document template can be automatically downloaded from a document library to a designated client and provided in a link menu for use as a building block to generate tailored documents.

In one embodiment, the client 104 and server 106 can be configured to communicate using a number of application programming interfaces (APIs), such as a number of web service APIs for example. As described above, a markup language, such as XML for example, can also be used to communicate information between the client 104, server 106, and one or more document libraries. In one embodiment, one or more APIs can be configured to read a default save location from an XML file generated by the generator component 122 as part of a save operation. As described above, the generator component 122 can generate an XML file to include a description of all the templates at a site location, such as a document library or other information repository. The one or more APIs can use the generated XML file to apply a default save location to a user generated document, wherein the default save location can be made dependent on the underlying template used to generate the user's document.

Figure 2:
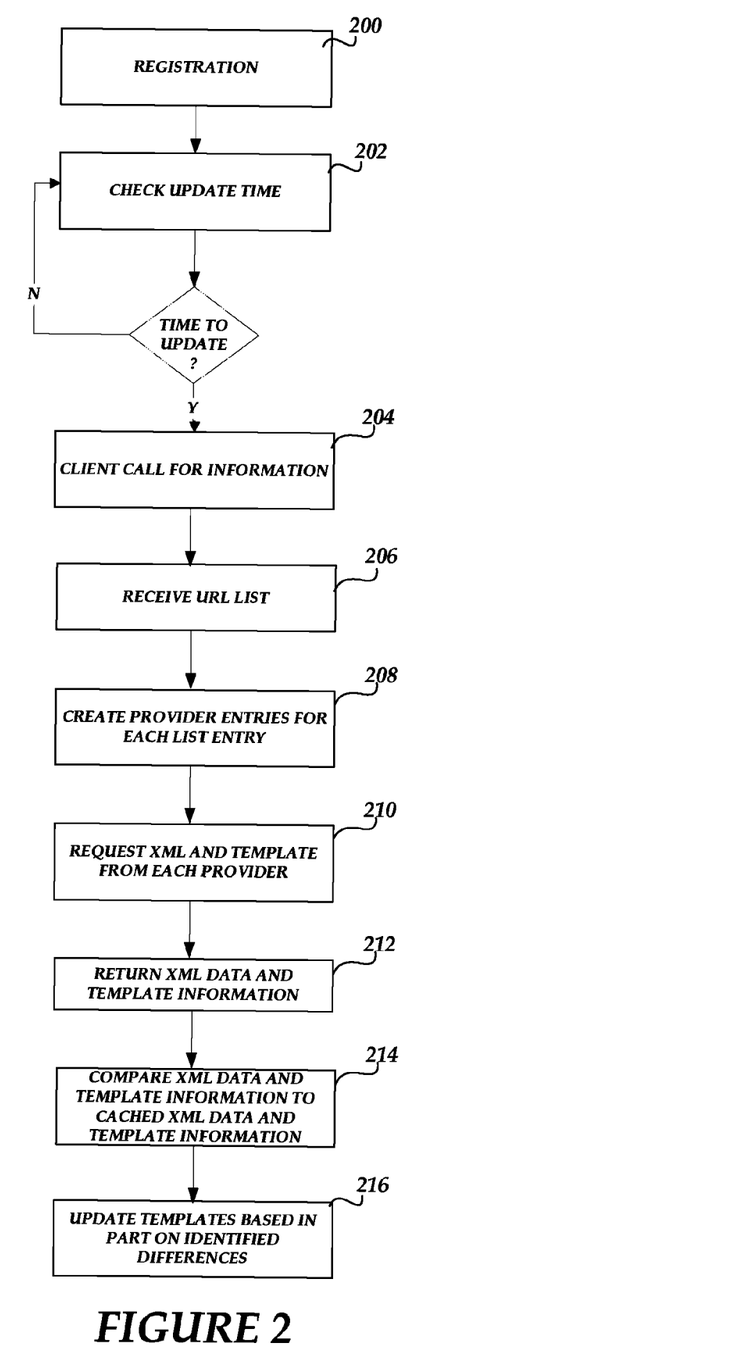
FIG. 2 is a flow diagram illustrating an exemplary process of updating information associated with a client.

FIG. 2 is a flow diagram illustrating an exemplary process of updating information associated with a client, in accordance with an embodiment. The components of FIG. 1 are referred to in the description of FIG. 1, but other component configurations and functionalities are available. Additionally, while a number and order of steps are shown, other embodiments are available. As described below, new and updated templates can be automatically provided to a client associated with the system 100, such as client 104. In one embodiment, binary template files, including the template schemas and associated metadata, can be provided and stored locally with a client. Once any new and/or updated templates have been provided to the client 104, a user can use the templates to generate work product. The description below presupposes that one or more new and/or updated templates have been added to one or more document libraries.

With continuing reference to FIG. 2, at 200, the client 104 can be used to register with the server 106. For example, a user can register using a profile with a shared services provider (SSP) to be associated with one or more document libraries. In one embodiment, as part of a registration process, and in order for the client 104 to gain visibility with the server 106, a URL associated with each document library can be added to a list associated with a user's links. An indicator, such as a flag for example, associated with each document library can also be set to identify that a particular document library should be used when providing templates to an associated user. For example, an SSP administrator can add URLs of appropriate document libraries to a published links location associated with the server 106 to make sure that the client 104 will have access to templates and other information associated therewith.

Additionally, as part of the registration process, a user can navigate to each desired document library and add the associated URL to a list associated with the user's links. For example, a user can use the "my links" interface to associate one or more document libraries with the user's profile. A user initiated action can also operate to set an indicator associated with each selected document library to indicate a preferred template repository. Thereafter, as described below, templates associated with each document library are available to an associated user.

As described briefly above, new and/or updated templates can be automatically provided to the client 104 after registering with the server 106 and logging-in. For example, a user can use the client 104 to register with the server 106 to create a profile, username, and password for logging-in to the system 100. An administrator can also control which document libraries and templates that a user can access. For example, certain group members are only able to access templates from document libraries that are associated with the particular group. Accordingly, the group members would be able to automatically retrieve or receive updated templates from the associated document libraries.

Once registered and logged-in, the client 104 can be configured to automatically locate templates for access and use by an associated user. Additionally, the client 104, on some basis, can use the update component 108 to automatically retrieve or receive template updates as part of a template update procedure. For example, the client 104 can periodically use the update component 108 to identify document libraries to use and update locally stored templates. In one embodiment, the template update procedure can be configured to occur as part of an idle task associated with the client 104.

As shown in FIG. 2, at 202, the client 104 can use the update component 108 to check an update or synchronization time to determine whether to update locally stored templates. For example, the update time can be programmed for each hour, day, week, month, etc. In another embodiment, the client 104 can use the update component 108 and begin the template update process when an application first launches or at a time when a user would like to see all available templates. For example, the client 104 can use the update component 108 to start the update process when a user selects "file" and "new" or the "file" and "open" dialog.

If it is not time to update, the flow returns to 202. If it is time to update, at 204 the client 104 calls the server 106 with a request for template updates. In one embodiment, the client 104 can be configured to make a web service call (e.g., using a Simple Object Access Protocol (SOAP)) requesting a list of relevant URLs from the server 106, wherein the relevant URLs are associated with document libraries having templates of interest to the user. For example, the client 104 can use a "PublishedLinksService" web service call to obtain a list of published links on the server 106 that are targeted to the client 104. The call can be implemented in part by writing a registry key that identifies the URL of the service that the client 104 calls to get a list of resource URLs that are appropriate for the client 104. The client 104 can use the URLs to locate and download templates of interest from the associated document library.

At 206, the server 106 returns a list of URLs (e.g., a user's "my links") and associated flags based in part on the client request. In an embodiment, the client 104 can operate to cache the returned URLs and flags in the registry, and create links for a site list based on the URLs and flags. At 208, the client 104 creates provider entries for each list entry in the list of URLs, wherein each provider entry corresponds to a document library having one or more templates of interest. In another embodiment, the server 106 can be configured to create the provider entries for each list entry associated with the list of URLs. Alternatively, the server 106 can use the URLs to automatically push templates to the client 104.

At 210, the client 104 sends a request to the server 106 for XML data and any templates from each provider delineated at 208. In one embodiment, the client 104 can be configured to request an XML file, including any metadata, which describes the template architectures, template locations, template modification information, and/or other template data. For example, the client 104 can request an XML file from each provider to include a URL of a save path to an associated document library, and the URL can be used when determining a default save location of any of the templates described in the XML file. At 212, the server 106 can operate to return the requested XML data from each designated provider, including relevant template information which can be used to determine whether to replace templates stored locally with the client 104. For example, the server 106 can return an XML file which includes an enumeration of templates, including template data and metadata, associated with each document library. Each XML file can include binary template files, schema, and any associated metadata, but the XML files are not so limited.

In one embodiment, the server 106 can also return template modification data that the client 104 can use to determine whether to replace locally stored templates by comparing the associated modification data with cached modification data. For example, the server 106 can return XML data which includes a template modification date and/or a template name that can be used to compare to a date and/or name of a locally stored template. At 214, the client 104 can use the update component 108 to compare the XML data associated with the relevant templates to the locally stored template data. For example, the client 104 can compare template attribute data to similar data cached in the local registry.

If the client 104 determines that the locally stored templates are out of date or otherwise require updating, at 216 the client 104 can replace the local templates with any new and/or updated templates associated with each document library. In one embodiment, the client 104 can compare local template attribute values with attribute values of templates associated with flagged document libraries to determine whether the local templates should be replaced with updated templates. In an alternative embodiment, the client 104 can be configured communicate template data associated with locally stored templates to the server 106 which the server 106 can use to determine if updated templates should be communicated to the client 104 to replace any outdated templates.

The client 104 can then operate to store any updated templates locally for use. If the update process is interrupted for some reason (e.g., timeout, network disconnect, etc.), the client 104 can resume the update process during a subsequent update process or idle period. Once the update process is complete, any new and/or updated templates are available to the user for some use. In one embodiment, new and/or updated templates can be presented to a user when the user selects "file" and then "new" from an associated application dialog. For example, templates from SharePoint® site locations discovered by the client 104 can be displayed to a user having authoring rights. Additionally, a user's work product generated from a template can be saved locally as well as at a default location associated with the document library. Furthermore, since any new or updated templates are saved locally, a user is able to work with a template while in an offline or disconnected mode.

Exemplary Operating Environment

Figure 3:
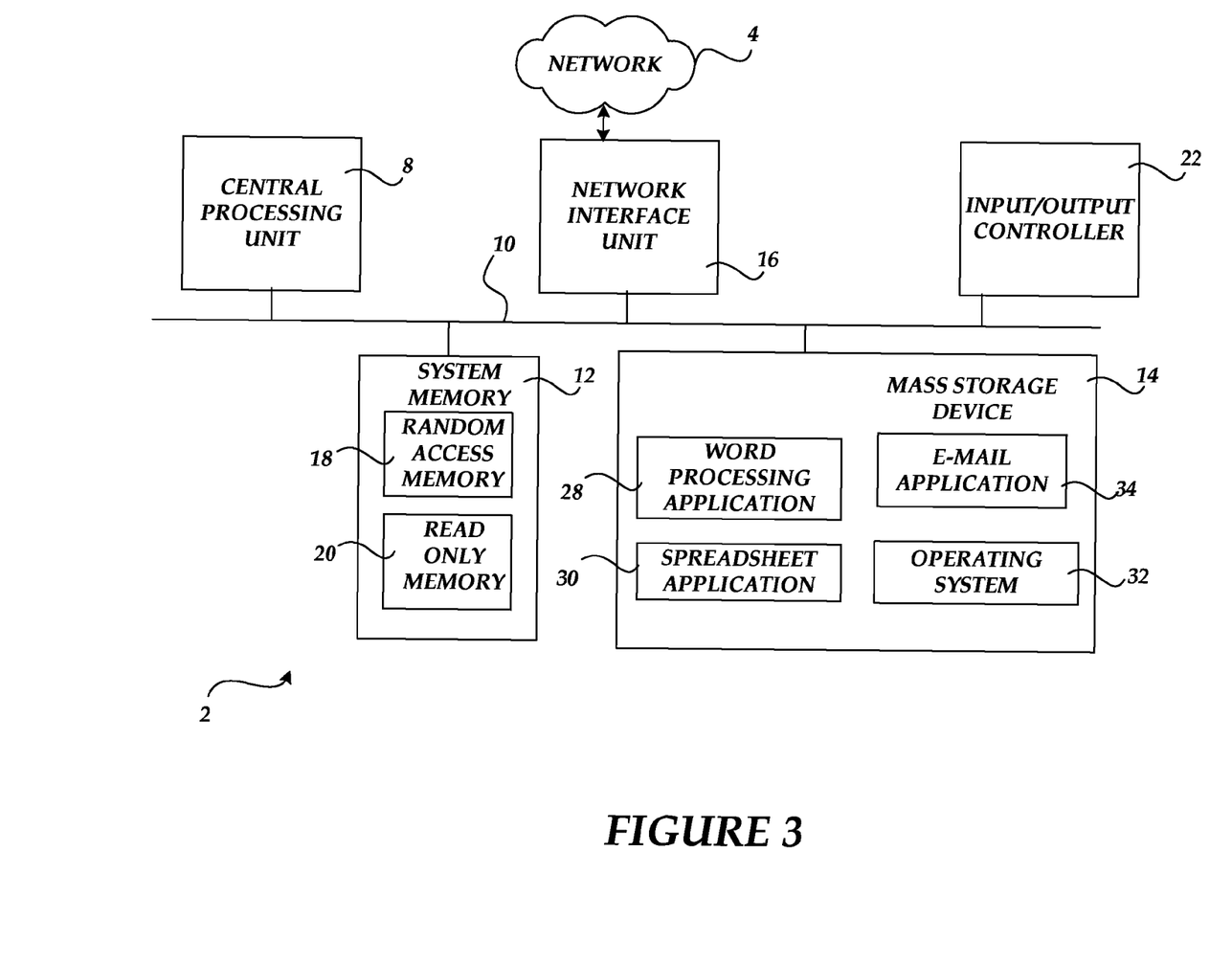
FIG. 3 is a block diagram illustrating an exemplary computing environment for implementation of various embodiments described herein.

Referring now to FIG. 3, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 3, an illustrative operating environment for embodiments of the invention will be described. As shown in FIG. 3, computer 2 comprises a general purpose desktop, laptop, handheld, tablet, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20.

The computer 2 further includes a mass storage device 14 for storing an operating system 32, application programs and other program modules. The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of input types, including a keyboard, mouse, pen, stylus, finger, and/or other means. Similarly, an input/output controller 22 may provide output to a display, a printer, or other type of output device. Additionally, a touch screen can serve as an input and an output mechanism.

As mentioned briefly above, a number of program modules and data files may be stored in the mass storage device 14 and RAM 18 of the computer 2, including an operating system 32 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as a word processing application 28, a spreadsheet application 30, e-mail application 34, drawing application, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A processor-based system to manage template updates by:
   receiving an update request based in part on an update time, wherein the update request includes a request for one or more links associated with one or more document libraries having one or more templates, wherein the one or more links are targeted to an associated user and point to targets that include the one or more document libraries and associated templates used in part to maintain locally stored templates for the associated user;
   generating markup data for the one or more templates associated with the one or more links, wherein the markup data includes template parameters, a description, and other information associated with the one or more templates of the one or more document libraries;
   setting a template synchronization flag to identify a document library to use as part of an update process including associating a first group of users with a first set of document libraries and a second group of users with a second set of document libraries;
   determining whether to replace a local template with an associated template targeted by a link including comparing a first template parameter of the local template with a second parameter of the associated template of the document library including comparing local template attribute values of the local template with attribute values of the associated template of the document library associated with the link;

maintaining the locally stored templates to correspond with new and updated templates associated with the one or more document libraries including determining which parts of a locally stored template require updating based in part on updated aspects of the associated template, including automatically updating the local template based in part on the comparison of the first and second template parameters; and storing template schemas and associated metadata locally with a client as part of the updating.

2. A system to manage templates comprising:

a server comprising:

a service component to:

administer aspects of one or more document libraries and to maintain one or more links targeted to an associated user and that point to targets that include the one or more document libraries and associated templates used in part to maintain locally stored templates for the associated user;

set a template synchronization flag to identify a document library to use as part of an update process; and, associate a first group of users with a first set of document libraries and a second group of users with a second set of document libraries; and, a generator component to generate markup data describing templates of one or more of the document libraries;

a client including an update component configured to initiate a template update process based in part on an evaluation of an update time, wherein the update component is configured to compare local template parameters with markup data generated by the generator component including comparing local template attribute values with attribute values of templates of an associated document library to determine whether to update one or more local templates and to determine whether to replace a local template with an associated template targeted by a link as part of maintaining the locally stored templates at the client to correspond with new and updated templates associated with the one or more document libraries and includes determining which parts of a locally stored template require updating based in part on updated aspects of the associated template, wherein the client automatically updates the local template based in part on a comparison of first and second template parameters; and, a store to store the locally stored templates for use by a client user, template schemas, and associated metadata locally with the client as part of the update.

3. A method of providing user templates comprising:

receiving a request to update the user templates, wherein the request is based in part on an update time and includes a request for links associated with document libraries, wherein the links are targeted to an associated user and point to targets that include the libraries and associated templates used in part to maintain locally stored templates for the associated user;

generating an XML file for each document library, wherein each XML file includes template data and metadata for templates associated with the corresponding document library and a description of the associated templates of each document library;

evaluating cached template data associated with a local template with template data of a template associated with one of the document libraries including comparing local template attribute values of the local template with attribute values of the template associated with one of the document libraries as part of determining whether to replace the local template with the template targeted by a link;

setting a template synchronization flag to identify a document library to use;

associating a first group of users with a first set of document libraries and a second group of users with a second set of document libraries;

replacing the local template with the template associated with one of the document libraries based in part on a comparison of first and second template parameters as part of maintaining the locally stored templates to correspond with new and updated templates, wherein replacing the local template includes determining which parts of the local template require updating based in part on updated aspects of the template associated with the link; and, storing template schemas and associated metadata locally with a client as part of the updating.

4. The system of claim 1, further configured to manage template updates by replacing the local template if the associated template has a modification date that is more recent than a modification date of the local template.

5. The system of claim 1, further configured to manage template updates by receiving a client-initiated web service call that includes a request for one or more uniform resource locators (URLs) associated with the one or more document libraries having the one or more templates.

6. The system of claim 1, further configured to manage template updates by presenting one or more updated templates in a user interface.

7. The system of claim 1, further configured to manage template updates by caching the markup data and one or more updated templates in a local store, wherein the one or more updated templates are available in an offline mode.

8. The system of claim 1, further configured to manage template updates by using an updated template to create a work product including a site where users can create, organize, and share information, a site for document collaboration, and a site where users can post information and allow others to provide comments.

9. The system of claim 1, further configured to manage template updates by administering an update of the one or more templates associated with the one or more document libraries.

10. The system of claim 1, further configured to manage template updates by creating provider entries for each link, and requesting an extensible markup language (XML) file from a provider associated with each link.

11. The system of claim 1, further configured to manage template updates by comparing a first template attribute value of the local template with a second template attribute value of the associated template of the document library.

12. The system of claim 1, further configured to manage template updates by registering with a serving component in order to receive template updates including an XML file and metadata that describes template architectures, template locations, and template modification information.

13. The system of claim 2, wherein the service component operates to set one or more indicators to identify particular document libraries to refer to during the update process when updating local templates associated with the client.

14. The system of claim 2, wherein the service component operates to update aspects of a template located in an associated document library.

15. The system of claim 2, wherein the client operates to request one or more URLs as part of maintaining the locally stored templates in a local storage medium, wherein the one or more URLs point to one or more document libraries having templates of interest.

16. The system of claim 2, wherein the generator component operates to generate an XML file describing all templates of an associated document library, wherein the XML file includes a URL of a save path to the associated document library.

17. The system of claim 16, wherein the client can use the URL of the save path to determine a default save location for an associated template.

18. The method of claim 3, further comprising replacing the local template with the template associated with one of the document libraries if the template has a modification date that is later than a local template modification date.

19. The method of claim 3, further comprising storing the template associated with one of the document libraries and the XML files in a local store available to an offline user.

* * * * *

UNITED STATES PATENT AND TRADEMARK OFFICE
CERTIFICATE OF CORRECTION

| | | |
|---|---|---|
| PATENT NO. | : 7,933,871 B2 | Page 1 of 1 |
| APPLICATION NO. | : 11/966426 | |
| DATED | : April 26, 2011 | |
| INVENTOR(S) | : Kenneth Charles LaToza et al. | |

It is certified that error appears in the above-identified patent and that said Letters Patent is hereby corrected as shown below:

In column 11, line 13, in Claim 1, delete "and" and insert -- and, --, therefor.

Signed and Sealed this
Nineteenth Day of July, 2011

David J. Kappos
*Director of the United States Patent and Trademark Office*